United States Patent
Chung et al.

(10) Patent No.: US 6,470,389 B1
(45) Date of Patent: *Oct. 22, 2002

(54) HOSTING A NETWORK SERVICE ON A CLUSTER OF SERVERS USING A SINGLE-ADDRESS IMAGE

(75) Inventors: Pi-Yu Chung, Berkeley Heights, NJ (US); Om P. Damani, Austin, TX (US); Yennun Huang, Bridgewater, NJ (US); Chandra M. Kintala, Warren, NJ (US); Yi-Min Wang, Berkeley Heights, NJ (US)

(73) Assignees: Lucent Technologies Inc., Murray Hill, NJ (US); AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/818,989

(22) Filed: Mar. 14, 1997

(51) Int. Cl.[7] .............................................. G06F 15/16
(52) U.S. Cl. ....................... 709/227; 709/245
(58) Field of Search ................. 395/674, 181, 395/200.33, 200.49, 200.65, 200.57, 200.58, 200.48; 370/401; 707/10, 227, 228, 218, 219, 235, 203, 5; 709/245

(56) References Cited

U.S. PATENT DOCUMENTS

| | | | |
|---|---|---|---|
| 5,371,852 A | | 12/1994 | Attanasio et al. |
| 5,485,579 A | * | 1/1996 | Hitz et al. .............. 395/200.12 |
| 5,661,719 A | * | 8/1997 | Townsend et al. .......... 370/216 |

OTHER PUBLICATIONS

S.L. Garfinkel, "The Wizard of Netscape," Webserver Magazine, Jul./Aug. 1996, pp. 59–63.

"Hypertext Transfer Protocol—HTTP/1.0," Network Working Group, May 1996, <http://www.ics.uci.edu/pub/ietf/http>.

D. Anderson, T. Yang, V. Holmedahl and O.H. Ibarra, "SWEB: Towards a Scalable World Wide Web Server on Multicomputers," <http://www.cs.ucsb.edu/research/rapid_sweb/SWEB.html>.

(List continued on next page.)

Primary Examiner—Moustafa M. Meky
Assistant Examiner—Tod Kupstas
(74) Attorney, Agent, or Firm—Ryan, Mason & Lewis, LLP

(57) ABSTRACT

Methods and apparatus for hosting a network service on a cluster of servers, each including a primary and a secondary Internet Protocol (IP) address. A common cluster address is assigned as the secondary address to each of the servers in the cluster. The cluster address may be assigned in UNIX-based servers using an ifconfig alias option, and may be a ghost IP address that is not used as a primary address by any server in the cluster. Client requests directed to the cluster address are dispatched such that only one of the servers of the cluster responds to a given client request. The dispatching may use a routing-based technique, in which all client requests directed to the cluster address are routed to a dispatcher connected to the local network of the server cluster. The dispatcher then applies a hash function to the client IP address in order to select one of the servers to process the request. The dispatching may alternatively use a broadcast-based technique, in which a router broadcasts client requests having the cluster address to all of the servers of the cluster over a local network. The servers then each provide a filtering routine, which may involve comparing a server identifier with a hash value generated from a client address, in order to ensure that only one server responds to each request broadcast by the router.

39 Claims, 3 Drawing Sheets

OTHER PUBLICATIONS

C. Yoshikawa, B. Chun, P. Eastham, A. Vahdat, T. Anderson and D. Culler, "Using Smart Clients to Build Scalable Services," Proceedings of USENIX 1997 Annual Technical Conference, Anaheim, California, Jan. 6–10, 1997.

T. Brisco, "DNS Support for Load Balancing," Network Working Group, RFC 1794, <http://andrew2.andrew.cmu.edu/rfc/rfc1794.html>.

T. Kwan, R. McGrath and D. Reed, NCSA's World Wide Web Server: Design and Perfomance, IEEE Computer, pp. 68–74, Nov. 1995.

D.M. Dias, W. Kish, R. Mukherjee and R. Tewari, "A Scalable and Highly Available Web Server," Proceedings of COMPCON '96, pp. 85–92, 1996.

E. Anderson, D. Patterson and E. Brewer, "The Magicrouter, an Application of Fast Packet Interposing," Symposium on Operating Systems Design and Implementation, OSDI, 1996, <http://www.cs.berkeley.edu/~eanders/magicrouter/osdi96–mr–submission/ps>.

Cisco Local Director, <http://www.cisco.com/warp/public/751/lodir/index.html>.

K. Egevang and P. Francis, "The IP Network Address Translator," Network Working Group, RFC 1631, <http://www.safety.net/rfc 1631.txt>.

"Two Servers, One Interface" <http://www.thesphere.com/~dlp/TwoServers/>.

W.R. Stevens, TCP/IP Illustrated, vol. 1, Ch. 4–6, pp. 53–83.

NetBSD Project, <http://www. NetBSD.org>.

W.R. Stevens, TCP/IP Illustrated, vol. 3, pp. 185–186.

Y. Huang and C. Kintala, "Software Implemented Fault Tolerance: Technologies and Experience," Proceedings of the $23^{rd}$ International Symposium on Fault–Tolerant Computing—FTCS, Toulouse, France, pp. 2–9, Jun. 1993.

IBM Interactive Network Dispatcher (IND), http://www.ics.raleigh.ibm.com/netdispatch, "Interactive Network Dispatcher Version 1.1 for Sun Solaris and Microsoft Windows," "NT Join Interactive Session Support for AIX," and "Interactive Session Support for AIX Manages Interactive Load Distribution Across AIX Clusters," 6 pp.

* cited by examiner

HOSTING A NETWORK SERVICE ON A CLUSTER OF SERVERS USING A SINGLE-ADDRESS IMAGE

FIELD OF THE INVENTION

The present invention relates generally to data communication networks such as the Internet and more particularly to techniques for hosting network services on a cluster of servers used to deliver data over a network in response to client requests, where the cluster of servers can be collectively identified by a client using a single-address image.

BACKGROUND OF THE INVENTION

With the explosive growth of the World Wide Web, many popular Internet web sites are heavily loaded with client requests. For example, it has been reported in S. L. Garfinkel, "The Wizard of Netscape," Webserver Magazine, July/August 1996, pp. 59–63, that home pages of Netscape Communications receive more than 80 million client requests or "hits" per day. A single server hosting a service is usually not sufficient to handle this type of aggressive growth. As a result, clients may experience slow response times and may be unable to access certain web sites. Upgrading the servers to more powerful machines may not always be cost-effective. Another common approach involves deploying a set of machines, also known as a cluster, and configuring the machines to work together to host a single service. Such a server cluster should preferably publicize only one server name for the entire cluster so that any configuration change inside the cluster does not affect client applications. The World Wide Web and other portions of the Internet utilize an application-level protocol, known as the Hypertext Transfer Protocol (HTTP), which is based on a client/server architecture. The HTTP protocol is described in greater detail in "Hypertext Transfer Protocol—HTTP/1.0," Network Working Group, May 1996, <http://www.ics.uci.edu/pub/ ietf/http>, which is incorporated by reference herein.

FIG. 1 illustrates an exemplary client/server architecture suitable for implementing HTTP-based network services on the Internet. A client 12 generates an HTTP request for a particular service, such as a request for information associated with a particular web site, and a Transmission Control Protocol/Internet Protocol (TCP/IP) connection is then established between the client 12 and a server 14 hosting the service. The client request is delivered to the server 14 in this example via a TCP/IP connection over a first network 16, a router 18 and a second network 20. The first network 16 may be a wide area communication network such as the Internet, while the second network 20 may be an Ethernet or other type of local area network (LAN) interconnecting server 14 with other servers in a server cluster. The router 18, also referred to as a gateway, performs a relaying function between the first and second networks which is transparent to the client 12.

The client request is generated by a web browser or other application-layer program operating in an application layer 22-1 of the client 12, and is responded to by a file transfer system or other program in an application layer 22-2 of the server 14. The requested network service may be designated by a Uniform Resource Locator (URL) which includes a domain name identifying the server 14 or a corresponding server cluster hosting the service. The application-level program of the client 12 initiates the TCP/IP connection by requesting a local or remote Domain Name Service (DNS) to map the server domain name to an IP address. The TCP and IP packet routing functions in client 12 and server 14 are provided in respective TCP layers 24-1, 24-2 and IP layers 26-1, 26-2. The TCP and IP layers are generally associated with the transport and network layers, respectively, of the well-known Open Systems Interconnection (OSI) model. The TCP layers 24-1, 24-2 process TCP packets of the client request and server response. The TCP packets each include a TCP header identifying a port number of the TCP connection between the client 12 and server 14. The IP layers 26-1, 26-2 process IP packets formed from the TCP packets of the TCP layers. The IP packets each include an IP header identifying an IP address of the TCP/IP connection between the client 12 and server 14.

The IP address for a given network service may be determined, as noted above, by the client accessing a conventional DNS. The IP layer 26-1 of the client 12 uses the resulting IP address as a destination address in the IP packet headers of client request packets. The IP address together with the TCP port number provide the complete transport address for the HTTP server process. The client 12 and server 14 also include data link and physical layers 28-1 for performing framing and other operations to configure client request or reply packets for transmission over the networks 16 and 20. The router 18 includes data link and physical layers 28-3 for converting client request and server reply packets to IP format, and an IP layer 26-3 for performing packet routing based on IP addresses. The server 14 responds to a given client request by supplying the requested information over the established TCP/IP connection in a number of reply packets. The TCP/IP connection is then closed.

There are many known techniques for distributing HTTP client requests to a cluster of servers. FIGS. 2 and 3 illustrate server-side single-IP-address image approaches which present a single IP address to the clients. An example of this approach is the TCP router approach described in D. M. Dias, W. Kish, R. Mukherjee and R. Tewari, "A Scalable and Highly Available Web Server," Proceedings of COMPCON '96, pp.85–92,1996, which is incorporated by reference herein. FIG. 2 illustrates the TCP router approach in which a client 12 establishes a TCP/IP connection over Internet 30 with a server-side router 32 having an IP address RA. The router 32 is connected via a LAN 36 to a server cluster 34 including N servers 14-i, i =1, 2, . . . N, having respective IP addresses S1, S2, . . . SN. Each server of the cluster 34 generally provides access to the same set of contents, and the contents may be replicated on a local disk of each server, shared on a network file system, or served by a distributed file system.

The single-address image is achieved by publicizing the address RA of the server-side router 32 to the clients via the DNS. The client 12 therefore uses RA as a destination IP address in its request. The request is directed to the router 32, which then dispatches the request to a selected server 14-k of server cluster 34 based on load characteristics, as indicated by the dashed line connecting client 12 to server 14-k via router 32. The router 32 performs this dispatching function by changing the destination IP address of each incoming IP packet of a given client request from the router address RA to the address Sk of selected server 14-k. The selected server 14-k responds to the client request by sending reply packets over the established TCP/IP connection, as indicated by the dashed line connecting server 14-k to client 12. In order to make the TCP/IP connection appear seamless to the client 12, the selected server 14-k changes the source IP address in its reply packets from its address Sk to the router address RA. The advantages of this approach are that it does not increase the number of TCP connections, and it is totally transparent to the clients. However, since the above-noted source IP address change is performed at the IP layer in a given server, the kernel code of every server in the cluster has to be modified to implement this mechanism. A proposed hybrid of the DNS approach and the TCP router approach, in which a DNS server selects one of several clusters of servers using a round-robin technique, suffers from the same problem.

FIG. 3 illustrates a server-side single-address image approach known as network address translation, as described in greater detail in E. Anderson, D. Patterson and E. Brewer, "The Magicrouter, an Application of Fast Packet Interposing," Symposium on Operating Systems Design and Implementation, OSDI, 1996, <http://www.cs.berkeley.edu/~eanders/magicrouter/osdi96-mr-submission.ps>, and Cisco Local Director, <http://www.cisco.com/warp/public/751/lodir/index.html>, which are incorporated by reference herein. As in the TCP router approach of FIG. 2, the client 12 uses the router address RA as a destination IP address in a client request, and the router 32 dispatches the request to a selected server 14-k by changing the destination IP address of each incoming request packet from the router address RA to the address Sk of selected server 14-k. However, in the network address translation approach, the source IP addresses in the reply packets from the selected server 14-k are changed not by server 14-k as in FIG. 2, but are instead changed by the router 32. The reply packet flow indicated by a dashed line in FIG. 2 thus passes from server 14-k to client 12 via router 32.

Compared to the TCP router approach of FIG. 2, network address translation has the advantage of server transparency. That is, no specific changes to the kernel code of the servers are required to implement the technique. However, both the TCP router and network address translation approaches require that the destination address in a request packet header be changed to a server address so that the server can accept the request. These approaches also require that the source address in a reply packet header be changed to the router address so that the client can accept the reply. These changes introduce additional processing overhead and unduly complicate the packet delivery process. In addition, because of the address changes, the above-described single-address image approaches may not be suitable for use with protocols that utilize IP addresses within an application, such as that described in K. Egevang and P. Francis, "The IP Network Address Translator," Network Working Group, RFC 1631, <http://www.safety.net/rfcl631.txt>, which is incorporated by reference herein. Furthermore, in both the TCP router and network address translation approaches, the router 32 needs to store an IP address mapping for every IP connection. Upon receiving an incoming packet associated with an existing TCP connection, the router has to search through all of the mappings to determine which server the packet should be forwarded to. The router itself may therefore become a bottleneck under heavy load conditions, necessitating the use of a more complex hardware design, as in the above-cited Cisco Local Director.

It is therefore apparent that a need exists for improved techniques for hosting a network service on a cluster of servers while presenting a single-address image to the clients, without the problems associated with the above-described conventional approaches.

SUMMARY OF THE INVENTION

The present invention provides methods and apparatus for hosting a network service on a cluster of servers. All of the servers in a server cluster configured in accordance with the invention may be designated by a single cluster address which is assigned as a secondary address to each server. All client requests for a web site or other network service associated with the cluster address are sent to the server cluster, and a dispatching mechanism is used to ensure that each client request is processed by only one server in the cluster. The dispatching may be configured to operate without increasing the number of TCP/IP connections required for each client request. The invention evenly distributes the client request load among the various servers of the cluster, masks the failure of any server or servers of the cluster by distributing client requests to the remaining servers without bringing down the service, and permits additional servers to be added to the cluster without bringing down the service. Although well-suited for use in hosting web site services, the techniques of the present invention may also be used to support a wide variety of other server applications.

In an exemplary embodiment of the invention, a network service is hosted by a server cluster in which each server includes a primary IP address and a secondary IP address. A common cluster address is assigned as the secondary IP address for each of the servers. The cluster address may be an IP address which does not correspond to a primary IP address of any of the servers. In UNIX-based servers, the cluster address may be assigned as the secondary address for a given server using an ifconfig alias option. If a given server includes multiple network interface cards, the cluster address may be assigned to one of the network interface cards using a UNIX ifconfig command without the alias option, or other similar technique. A router is coupled to a local network of the server cluster and is also coupled via the Internet to a client. The router receives client requests from the Internet, and uses a dispatching technique to direct client requests having the cluster address as a destination. The client requests are dispatched such that each of the requests is processed by only one of the servers in the cluster. The dispatching function may be based on the result of applying a hash function to an IP address of the given client. A suitable hash function may be determined using an analysis of a distribution of client IP addresses in an access log associated with one or more of the servers. In the event that a server has failed, the hash function may be reapplied to the client IP address to identify another server.

Two illustrative dispatching techniques for providing a single-address image for a server cluster in accordance with the invention include routing-based dispatching and broadcast-based dispatching. In the routing-based technique, a dispatcher is coupled to the router and to a local network of the server cluster. The router directs client requests having the cluster address to the dispatcher, and the dispatcher selects a particular one of the servers to process a given client request based on the result of applying a hash function to the client address. In the broadcast-based technique, the router broadcasts client requests having the cluster address to each of the servers over the local network of the server cluster. Each of the servers implements a filtering routine to ensure that each client request is processed by only one of the servers. The filtering routine may involve applying a hash function to the client IP address associated with a given client request, and comparing the result to a server identifier to determine whether that server should process the client request.

The techniques of the present invention provide fast dispatching and can be implemented with reduced cost and complexity. The techniques are suitable for use in TCP/IP networks as well as networks based on a variety of other standards and protocols. Unlike the conventional single-address image approaches, the present invention does not require that a destination address in a request packet header be changed to a server address so that the server can accept the request, or that a source address in a reply packet header be changed to the router address so that the client can accept the reply. In addition, the router need not store an IP address mapping for every IP connection, nor is it required to search through such a mapping to determine which server a packet should be forwarded to. The router itself will therefore not become a bottleneck under heavy load conditions, and special router hardware designs are not required. These and other features and advantages of the present invention will become more apparent from the accompanying drawings and the following detailed description.

DETAILED DESCRIPTION OF THE INVENTION

Figure 1:
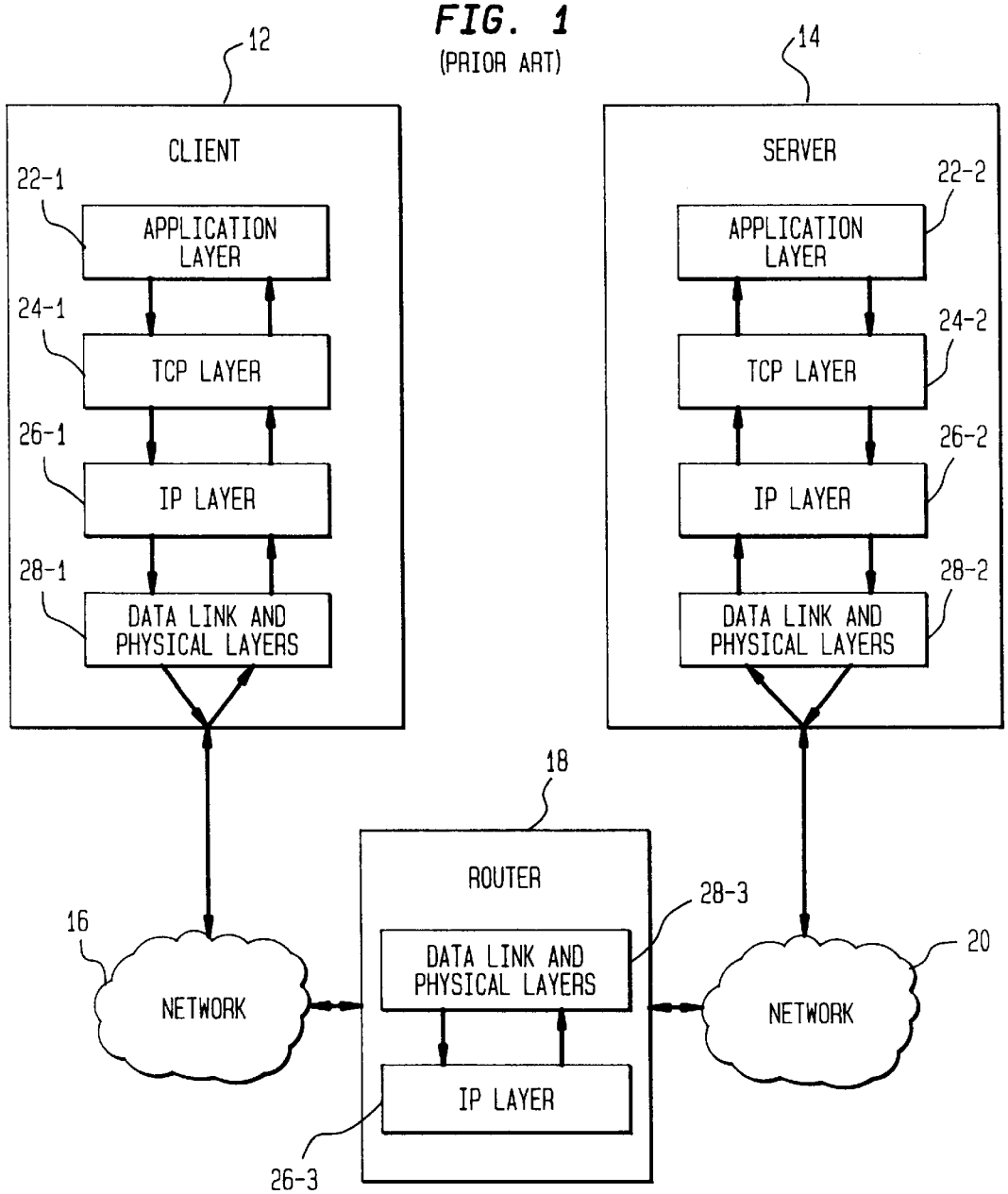
FIG. 1 is a block diagram illustrating a conventional client-server interconnection in accordance with the TCP/IP standard.
Figure 2:
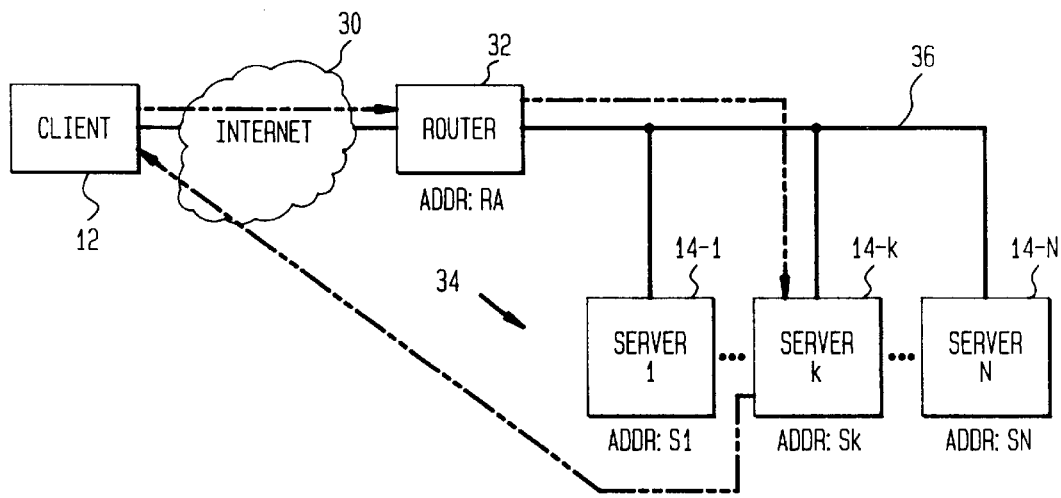
FIG. 2 illustrates a prior art TCP router technique for hosting a network service on a cluster of servers.
Figure 3:
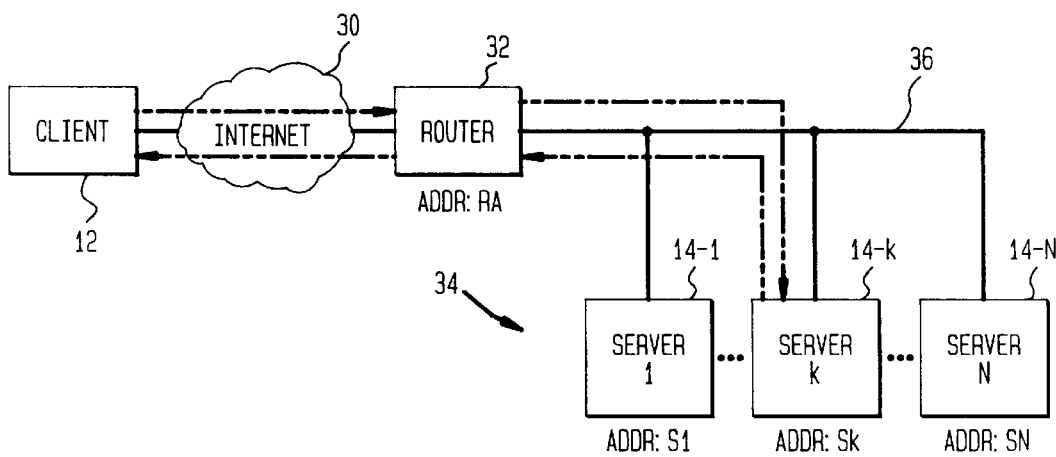
FIG. 3 illustrates a prior art network address translation technique for hosting a network service on a cluster of servers.

The present invention will be illustrated below in conjunction with exemplary client/ server connections established over the Internet to a server cluster using the Transmission Control Protocol/Internet Protocol (TCP/IP) standard. It should be understood, however, that the invention is not limited to use with any particular type of network or network communication protocol. The disclosed techniques are suitable for use with a wide variety of other networks and protocols. The term "server cluster" as used herein refers to a group or set of servers interconnected or otherwise configured to host a network service. The terms "cluster address" and "single-address image" refer generally to an address associated with a group of servers configured to support a network service or services. A "ghost IP address" is one type of cluster address in the form of an IP address which is not used as a primary address for any server of a given server cluster. The term "network service" is intended to include web sites, Internet sites and data delivery services, as well as any other data transfer mechanism accessible by a client over a network. The term "client request" refers to a communication from a client which initiates the network service. A given client request may include multiple packets or only a single packet, depending on the nature of the request.

The present invention provides an improved single-address image approach to distributing client requests to servers of a server cluster. In a preferred embodiment, the invention allows all servers of a server cluster to share a single common IP address as a secondary address. The secondary address is also referred to herein as a cluster address, and may be established using an ifconfig alias option available on most UNIX-based systems, or similar techniques available on other systems. The cluster address may be publicized to clients using the above-noted Domain Name Service (DNS) which translates domain names associated with Uniform Resource Locators (URLs) to IP addresses. All client requests to be directed to a service hosted by the server cluster are sent to the single cluster address, and dispatched to a selected one of the servers using routing-based or broadcast-based dispatching techniques to be described in greater detail below. Once a server is selected, future request packets associated with the same client request may be directed to the same server. All other communications within the server cluster may utilize primary IP addresses of the servers.

The above-noted ifconfig alias option is typically used to allow a single server to serve more than one domain name. For example, the ifconfig alias option allows a single server to attach multiple IP addresses, and thus multiple domain names, to a single network interface, as described in "Two Servers, One Interface" <http://www.thesphere.com/~dlp/TwoServers/>, which is incorporated by reference herein. Client requests directed to any of the multiple domain names can then be serviced by the same server. The server determines which domain name a given request is associated with by examining the destination address in the request packet. The present invention utilizes the ifconfig alias option to allow two servers to share the same IP address. Normally, two servers cannot share the same IP address because such an arrangement would cause any packet destined for the shared address to be accepted and responded to by both servers, confusing the client and possibly leading to a connection reset. Therefore, before a server is permitted to attach a new IP address to its network interface, a check may be made to ensure that no other server on the same local area network (LAN) is using that IP address. If a duplicate address is found, both servers are informed and warnings are issued. The routing-based or broadcast-based dispatching of the present invention ensures that every packet is processed by only one server of the cluster, such that the above-noted warnings do not create a problem.

An alternative technique for assigning a secondary address to a given server of a server cluster in accordance with the invention involves configuring the given server to include multiple network interface cards such that a different address can be assigned to each of the network interface cards. For example, in a UNIX-based system, conventional ifconfig commands may be used, without the above-described alias option, to assign a primary IP address to one of the network interface cards and a secondary IP address to another of the network interface cards. The secondary IP address is also assigned as a secondary IP address to the remaining servers in the cluster, and used as a cluster address for directing client requests to the cluster.

The exemplary embodiments of the present invention to be described below utilize dispatching techniques in which servers are selected based on a hash value of the client IP address. The hash value may be generated by applying a hash function to the client IP address, or by applying another suitable function to generate a hash value from the client IP address. For example, given N servers and a packet from a client having a client address CA, a dispatching function in accordance with the invention may compute a hash value k as CA mod (N−1) and select server k to process the packet. This ensures that all request or reply packets of the same TCP/IP connection are directed to the same server in the server cluster. A suitable hash function may be determined by analyzing a distribution of client IP addresses in actual access logs associated with the servers such that client requests are approximately evenly distributed to all servers. When a server in the cluster fails, the subset of clients assigned to that server will not be able to connect to it. The present invention addresses this potential problem by dynamically modifying the dispatching function upon detection of a server failure. If the hash value of a given client IP address maps to the failed server, the client IP address is rehashed to map to a non-failed server, and the connections of the remaining clients are not affected by the failure.

Figure 4:
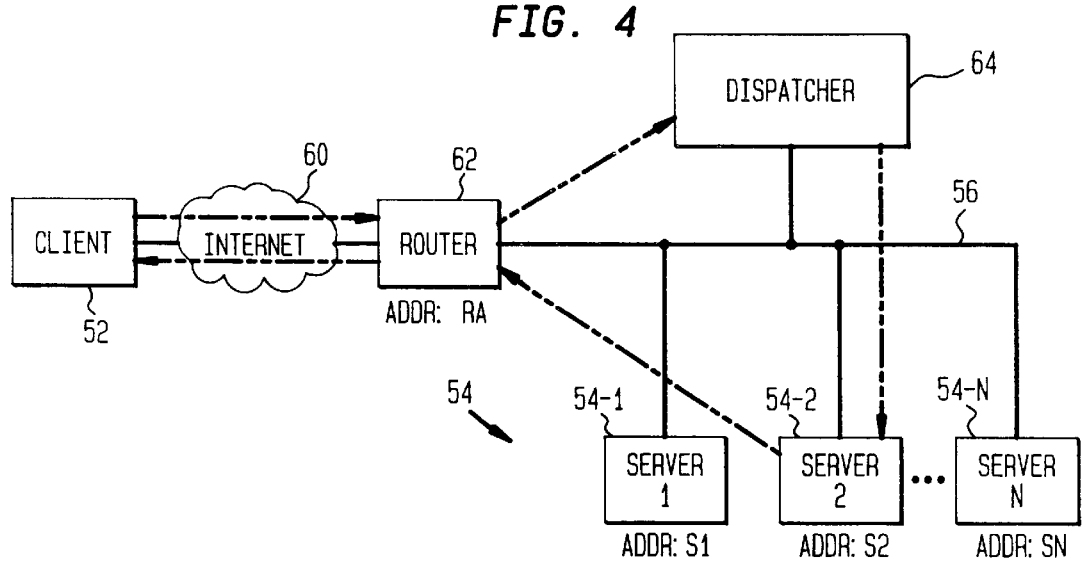
FIG. 4 illustrates a technique for hosting a network service on a cluster of servers using routing-based dispatching in accordance with an exemplary embodiment of the invention.

FIG. 4 illustrates a routing-based dispatching technique in accordance with the present invention. Solid lines indicate network connections, while dashed lines show the path of an exemplary client request and the corresponding reply. A client 52 sends a client request to a server cluster 54 including N servers 54-i, i=1, 2, . . . N having IP addresses S1, S2, . . . SN and interconnected by an Ethernet or other type of LAN 56. The client request is formulated in accordance with the above-described HTTP protocol, and may include a URL with a domain name associated with a web site or other network service hosted by the server cluster 54. The client accesses a DNS to determine an IP address for the domain name of the service, and then uses the IP address to establish a TCP/IP connection for communicating with one of the servers 54-i of the server cluster 54. In accordance with the invention, a "ghost" IP address is publicized to the DNS as a cluster address for the server cluster 54. The ghost IP address is selected such that none of the servers 54-i of cluster 54 has that IP address as its primary address. Therefore, any request packets directed to the ghost IP address are associated with client requests for the service of the single-address image cluster 54. The use of the ghost IP address thus distinguishes a network service hosted by the cluster from activities of the servers 54-i which utilize the primary server addresses, and prevents interference with these primary address activities.

The client 52 uses the ghost IP address as a cluster address for directing its request to the server cluster 54. The request is directed over Internet 60 to a router 62 having an IP address RA. The router 62 includes a routing table having an entry or record directing any incoming request packets having the ghost IP address to a dispatcher 64 connected to the LAN 56. The dispatcher 64 includes an operating system configured to run in a router mode, using a routing algorithm which performs the dispatching described herein. In alternative embodiments, the functions of the dispatcher 64 could be incorporated into the router 62 in order to provide additional efficiency improvements. Each of the servers 54-i of the cluster 54 utilizes the above-described ifconfig alias option to set the ghost IP address as their secondary address. As noted above, this technique for setting a secondary address for each of the servers 54-i generally does not require any alteration of the kernel code running on the servers. In alternative embodiments, one or more of the servers 54-i may be configured to include multiple network interface cards, as previously noted, such that a different address can be assigned to each of the network interface cards of a given server using a UNIX ifconfig command or other similar technique.

The router 62 routes any packets having the ghost IP address to the dispatcher 64 in accordance with the above-noted routing table record. The dispatcher 64 then applies a hash function to the client IP address in a given request packet to determine which of the servers 54-i the given packet should be routed to. In the example illustrated in FIG. 4, the dispatcher 64 applies a hash function to the IP address of client 52 and determines that the corresponding request packet should be routed to server 54-2 at IP address S2. The dispatcher 64 then routes the request packet to the server 54-2 over LAN 56, as indicated by the dashed line, using the primary address S2 of server 54-2 to distinguish it from the other servers of cluster 54. After the network interface of server 54-2 accepts the packet, all higher level processing may be based on the ghost IP address because that is the destination address in the packet IP header and possibly in the application-layer packet contents. After processing the request, the server 54-2 replies directly to the client 52 via router 62 over the established TCP/IP connection, using the ghost IP address, and without passing through the dispatcher 64.

It should be noted that when a request packet destined for the ghost IP address is received by the network interface of dispatcher 64 and placed back onto the same network interface for delivery to one of the servers 54-i over LAN 56, it may cause an Internet control message protocol (ICMP) host redirect message to be sent to the router 62. This ICMP message is designed to direct the router 62 to update its routing table such that any future packets having the ghost IP address can bypass the dispatcher 64 and go directly to the destination server, as described in greater detail in W. R. Stevens, TCP/IP Illustrated, Vol. 1, Ch. 6, pp. 69–83, which is incorporated by reference herein. However, this effect is undesirable in the routing technique of FIG. 4 because the dispatcher 64 performs the server selection process as previously described. It therefore may be necessary to suppress the ICMP host redirect message for the ghost IP address by, for example, removing or altering the corresponding operating system code in the dispatcher. In the above-mentioned alternative embodiments in which the dispatching function is implemented within the router 62, the ICMP redirect message is not generated and therefore need not be suppressed. Another potential problem may arise when a reply packet is sent back to the client 52 from the selected server 54-2 with the ghost IP address, in that it may cause the router 62 to associate, in its Address Resolution Protocol (ARP) cache, the ghost IP address with the LAN address of the selected server. The operation of the ARP cache is described in greater detail in W. R. Stevens, TCP/IP Illustrated, Vol. 1, Chs. 4 and 5, pp. 53–68, which is incorporated by reference herein. The illustrative embodiment of FIG. 4 avoids this problem by automatically routing the request packets to the dispatcher 64, and then dispatching based on the server primary IP address, such that the router ARP cache is not used.

Figure 5:
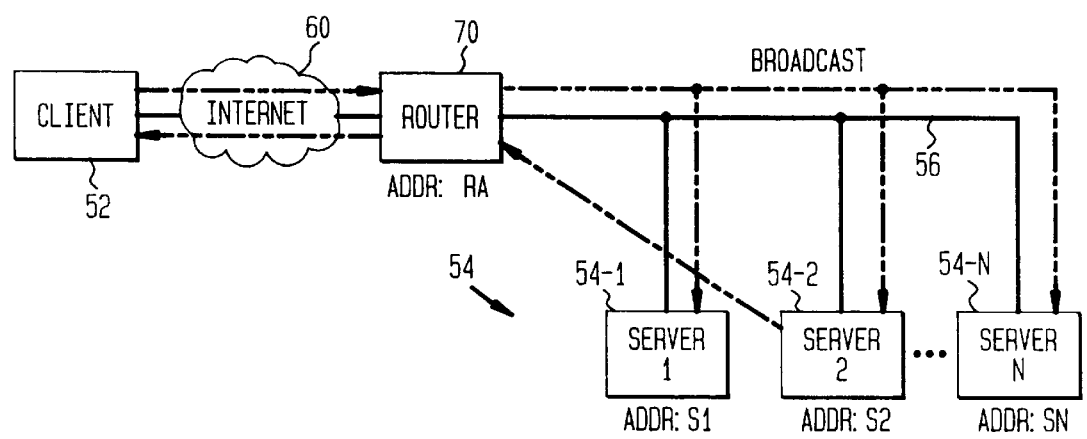
FIG. 5 illustrates a technique for hosting a network service on a cluster of servers using broadcast-based dispatching in accordance with another exemplary embodiment of the invention.

FIG. 5 illustrates a broadcast-based dispatching technique in accordance with the present invention. Again, solid lines indicate network connections, while dashed lines show the path of an exemplary client request and the corresponding reply. As in the FIG. 4 routing-based embodiment, client 52 sends a client request to server cluster 54 including N servers 54-i, i =1, 2, . . . N connected to LAN 56 and having IP addresses S1, S2, . . . SN. The client 52 uses the above-described ghost address as a cluster address for directing its request to the server cluster 54. The request is directed over Internet 60 to a router 70 having an IP address RA. The router 70 broadcasts any incoming request packets having the ghost IP address to the LAN 56 interconnecting the servers 54-i of the server cluster 54, such that the request packet is received by each of the servers 54-i.

Each of the servers 54-i of the cluster 54 implements a filtering routine in order to ensure that only one of the servers 54-i processes a given client request. The filtering routine may be added to a device driver of each of the servers 54-i. In an exemplary implementation, each of the servers 54-i is assigned a unique identification (ID) number. The filtering routine of a given server 54-i computes a hash value of the client IP address and compares it to the ID number of the given server. If the hash value and the ID number do not match, the filtering routine of the given server rejects the packet. If the hash value and the ID number do match, the given server accepts and processes the packet as if it had received the packet through a conventional IP routing mechanism. In the illustrative example of FIG. 5, a packet associated with the request from client 52 is broadcast by the router 70 to each of the servers 54-i of the server cluster 54 over the LAN 56 as previously noted. The filtering routine of server 54-2 generates a hash value of the client IP address which matches the unique ID number associated with server 14-2, and server 14-2 therefore accepts and processes the packet. The filtering routines of the N−1 other servers 54-i each indicate no match between the client IP address and the corresponding server ID number, and therefore discard the broadcast packet. The reply packets are sent back to the client 52 via router 70, as indicated by the dashed lines, using the ghost IP address.

The broadcast-based dispatching technique of FIG. 5 may be implemented using a permanent ARP entry within the router 70, to associate the ghost IP address with the Ethernet or other local network broadcast address associated with LAN 56 of the cluster 54. A potential problem is that any reply packet from a selected server appears to be coming from the ghost IP address, and may therefore cause the router 70 to overwrite the entry in its ARP cache such that the ghost IP address is associated with the LAN address of the selected server. This potential problem may be addressed by setting up a routing table entry in the router 70 to direct all packets having a ghost IP destination address to a second ghost IP address which is a legal subnet address in the LAN 56 of the server cluster 54 but is not used by any server. In addition, an entry is inserted in the ARP cache of the router 70 to associate the second ghost IP address with the broadcast address of the LAN 56. When the router 70 routes a packet to the second ghost IP address, it will then actually broadcast the packet to each of the servers 54-i of the cluster 54. Since no reply packet is sent from the second ghost IP address, the corresponding entry of the router ARP cache will remain unchanged. Another potential problem is that some operating systems, such as the NetBSD operating system, do not allow a TCP packet to be processed if it is received from a broadcast address. This potential problem may be avoided by a suitable modification to the broadcast address in the LAN packet header attached to the packet.

The routing-based and broadcast-based dispatching techniques described in conjunction with FIGS. 4 and 5 above have been implemented on a cluster of Sun SPARC workstations. The NetBSD operating system, as described in NetBSD Project, <http://www. NetBSD.org>, was used to provide any needed kernel code modifications. The dispatching overhead associated with both techniques is minimal because the packet dispatching is based on simple IP address hashing, without the need for storing or searching any address-mapping information. In the routing-based dispatching technique, the additional routing step in the dispatcher 64 typically adds a delay of about 1 to 2 msecs to the TCP round-trip time of each incoming request packet. A study in W. R. Stevens, TCP/IP Illustrated, Volume 3, pp. 185–186, which is incorporated by reference herein, indicates that the median TCP round-trip time is 187 msecs. The additional delay attributable to the routing-based dispatching is therefore negligible. Although the additional routing step for every request packet sent to the ghost IP address may increase the traffic in the LAN of the server cluster, the size of a request in many important applications is typically much smaller than that of the corresponding response, which is delivered directly to the client without the additional routing. In the broadcast-based dispatching technique, the broadcasting of each incoming request packet on the LAN of the server cluster does not substantially increase network traffic. Although a hash value is computed for each incoming packet having the ghost IP destination address, which increases the CPU load of each server, this additional computation overhead is negligible relative to the corresponding communication delay.

Both the routing-based and broadcast-based dispatching techniques of the present invention are scalable to support relatively large numbers of servers. Although the dispatcher in the routing-based technique could present a potential bottleneck in certain applications, a study in the above-cited D. M. Dias et al. reference indicates that a single dispatcher can support up to 75 server nodes, which is sufficient support for many practical systems. The number of servers supported may be even higher with the present invention given that the routing-based dispatching functions described herein are generally simpler than those in the D. M. Dias et al. reference. It should also be noted that additional scalability can be obtained by combining the routing-based dispatching of the present invention with a DNS round-robin technique. For example, a DNS server may be used to map a domain name to one of a number of different ghost IP addresses belonging to different server clusters using a round-robin technique. In the broadcast-based dispatching technique, there is no potential dispatching bottleneck, although the device drivers or other portions of the servers may need to be modified to provide the above-described filtering routines.

The routing-based and broadcast-based dispatching of the present invention can also provide load balancing and failure handling capabilities. For example, given N servers and a packet from client address CA, the above-described routing-based dispatching function may compute a hash value k as CA mod (N−1) and select server k to process the packet. More sophisticated dispatching functions can also be used, and may involve analyzing the actual service access log to provide more effective load balancing. In order to detect failures, each server may be monitored by a watchdog daemon such as the watchd daemon described in greater detail in Y. Huang and C. Kintala, "Software Implemented Fault Tolerance: Technologies and Experience," Proceedings of the 23$^{rd}$ International Symposium on Fault-Tolerant Computing—FTCS, Toulouse, France, pp. 2–9, June 1993, which is incorporated by reference herein. When a server fails, the corresponding watchd daemon initiates a change of the dispatching function to mask the failure and rebalance the load. A system call interface may be implemented to allow the dispatching function to be changed while the servers remain on-line. In routing-based dispatching, the watchd daemon may notify the dispatcher to change the dispatching function, while in broadcast-based dispatching, all servers may be notified to modify their filtering routines. For example, if a server k fails, the new dispatching function may check to see if the hash value CA mod N equals k. If it does, a new hash value j=CA mod (N−1) is computed. If j is less than k, the packet goes to server j. Otherwise, the packet goes to server j+1. This technique does not affect the clients of non-failed servers, reassigns the clients of the failed server evenly to the remaining servers, and can be readily extended to handle multiple server failures. Additional servers can be added to the cluster without bringing down the service by changing the dispatching function from CA mod N to CA mod (N+1).

In routing-based dispatching, the dispatcher may become a single point of failure, and therefore should also be monitored by a watchd daemon or other suitable failure monitoring mechanism. Upon detecting a failure, the watchd daemon may trigger a transfer of the dispatching function from the primary dispatcher to a backup dispatcher, and then direct the router to change the entry in its routing table such that future incoming request packets are routed to the backup dispatcher. Since no mapping table is maintained by the primary dispatcher, this approach is substantially stateless. Proper routing may be ensured by simply utilizing consistent routing functions in the primary and backup dispatchers, without the substantial additional costs associated with mapping-based approaches.

The use of the ifconfig alias option or other similar technique to provide a single-address image for a server cluster provides a number of advantages over the conventional techniques described previously. For example, it avoids the need to change the destination address in a request packet header so that a particular server can accept the request, and the need to change the source address in a reply packet header to the cluster address so that the client can accept the reply. With the single-address image approach of the present invention, all servers can accept and respond to packets having the cluster address, so that the addresses in the request and reply packet headers do not need to be modified. Since the single-image approach of the present invention does not require alteration of the packet addresses, it is suitable for use with a wide variety of protocols, including those protocols which utilize IP addresses within an application program. In addition, the single-address image approach of the present invention does not require a router to store or to search through a potentially large number of IP address mappings in order to determine which cluster server should receive a request packet. The invention thus effectively removes the possibility that the router may become a bottleneck under heavy load conditions.

The above-described embodiments of the invention are intended to be illustrative only. Numerous alternative embodiments may be devised by those skilled in the art without departing from the scope of the following claims.

What is claimed is:

1. A method of routing client requests to a plurality of servers configured to support a network service over a communication network, each of the servers having a primary address, the method comprising the steps of:

assigning a common address as a secondary address for each of the plurality of servers such that each of the servers individually has the secondary address; and processing client requests directed to the common address such that each of the requests is processed by a particular one of the plurality of servers without modification of the common address in the request.

2. The method of claim 1 wherein the network utilizes a TCP/IP protocol and the primary and secondary addresses are primary and secondary IP addresses, respectively.

3. The method of claim 2 wherein the common address is an IP address which does not correspond to a primary IP address of any of the plurality of servers.

4. The method of claim 1 wherein at least one of the plurality of servers is a UNIX-based server including multiple network interface cards, and the assigning step includes assigning the common address for the at least one server using an ifconfig command.

5. The method of claim 1 wherein the plurality of servers are UNIX-based servers, and the assigning step includes assigning the common address utilizing an ifconfig alias option for at least a subset of the plurality of servers.

6. The method of claim 1 wherein the processing step includes the step of dispatching a request of a given client to one of the plurality of servers based on application of a hash function to an IP address of the given client.

7. The method of claim 6 wherein the hash function is determined based on an analysis of a distribution of client IP addresses in an access log associated with one or more of the servers.

8. The method of claim 6 wherein the dispatching step includes reapplying the hash function to the client IP address to identify another server if a server identified as a result of a previous application of the hash function has failed.

9. The method of claim 1 wherein the processing step includes the steps of:

routing client requests directed to the common address to a dispatcher connected to a local network associated with the plurality of servers; and selecting a particular one of the servers to process a given client request based on application of a hash function to a corresponding client address in the dispatcher.

10. The method of claim 1 wherein the processing step includes the steps of:

broadcasting a given client request directed to the common address to each of the plurality of servers over a local network associated with the servers; and implementing a filtering routine in each of the plurality of servers so that the given client request is processed by only one of the servers.

11. The method of claim 10 wherein the implementing step includes the steps of:

applying a hash function to a client IP address associated with the given client request; and comparing the result of the applying step to an identifier of a particular server to determine whether that server should process the given client request.

12. An apparatus for routing client requests to a plurality of servers configured to support a network service over a communication network, each of the servers having a primary address, the apparatus comprising:

means for assigning a common address as a secondary address for each of the plurality of servers such that each of the servers individually has the secondary address; and means for processing client requests directed to the common address such that each of the requests is processed by a particular one of the plurality of servers without modification of the common address in the request.

13. The apparatus of claim 12 wherein the network utilizes a TCP/IP protocol and the primary and secondary addresses are primary and secondary IP addresses, respectively.

14. The apparatus of claim 13 wherein the common address is an IP address which does not correspond to a primary IP address of any of the plurality of servers.

15. The apparatus of claim 12 wherein at least one of the plurality of servers is a UNIX-based server including multiple network interface cards, and the assigning means is operative to assign the common address for the at least one server using an ifconfig command.

16. The apparatus of claim 12 wherein the plurality of servers are UNIX-based servers, and the assigning means is operative to assign the common address utilizing an ifconfig alias option for at least a subset of the plurality of servers.

17. The apparatus of claim 12 wherein the processing means is operative to dispatch a request of a given client to one of the plurality of servers based on application of a hash function to an IP address of the given client.

18. The apparatus of claim 17 wherein the hash function is determined based on an analysis of a distribution of client IP addresses in an access log associated with one or more of the servers.

19. The apparatus of claim 17 wherein the processing means is further operative to reapply the hash function to the client IP address to identify another server if a server identified as a result of a previous application of the hash function has failed.

20. The apparatus of claim 12 wherein the processing means further includes a dispatcher connected to a local network associated with the plurality of servers, wherein the dispatcher is operative to receive client requests directed to the common address, and to select a particular one of the servers to process a given client request based on application of a hash function to a corresponding client address.

21. The apparatus of claim 12 wherein the processing means further includes:
means for broadcasting a given client request directed to the common address to each of the plurality of servers over a local network associated with the servers; and
means for filtering the given client request in each of the plurality of servers so that the given client request is processed by only one of the servers.

22. The apparatus of claim 21 wherein the filtering means is operative to apply a hash function to a client IP address associated with the given client request, and to compare the result of the applying step to an identifier of a particular server to determine whether that server should process the given client request.

23. An apparatus for routing client requests for a network service over a communication network, the apparatus comprising:
a plurality of servers configured to support the network service, each of the servers having a primary address and a secondary address, wherein a common address is assigned as the secondary address for each of the plurality of servers such that each of the servers individually has the secondary address; and
a router coupled to the servers and operative to route client requests directed to the common address such that each of the requests is processed by a particular one of the plurality of servers without modification of the common address in the request.

24. The apparatus of claim 23 wherein the network utilizes a TCP/IP protocol and the primary and secondary addresses are primary and secondary IP addresses, respectively.

25. The apparatus of claim 24 wherein the common address is an IP address which does not correspond to a primary IP address of any of the plurality of servers.

26. The apparatus of claim 23 wherein at least one of the plurality of servers is a UNIX-based server including multiple network interface cards, and the common address is assigned for the at least one server using an ifconfig command.

27. The apparatus of claim 23 wherein the plurality of servers are UNIX-based servers, and the common address is assigned as the secondary address of the plurality of servers by utilizing an ifconfig alias option for at least a subset of the plurality of servers.

28. The apparatus of claim 23 wherein the router is further operative to route client requests such that a request of a given client is routed to one of the plurality of servers based on application of a hash function to an IP address of the given client.

29. The apparatus of claim 28 wherein the hash function is determined based on an analysis of a distribution of client IP addresses in an access log associated with one or more of the servers.

30. The apparatus of claim 28 wherein the hash function is reapplied to the client IP address to identify another server if a server identified as a result of a previous application of the hash function has failed.

31. The apparatus of claim 23 further including a dispatcher coupled to the router and to a local network associated with the plurality of servers, such that the router directs client requests having the common address to the dispatcher, and the dispatcher selects a particular one of the servers to process a given client request based on application of a hash function to a corresponding client address.

32. The apparatus of claim 23 wherein the router is further operative to broadcast a given client request directed to the common address to each of the plurality of servers over a local network associated with the servers, and further wherein each of the servers implements a filtering routine so that the given client request is processed by only one of the servers.

33. The apparatus of claim 32 wherein the filtering routine involves applying a hash function to a client IP address associated with the given client request, and comparing the result to an identifier of a particular server to determine whether that server should process the given client request.

34. A method of routing client requests to a plurality of servers configured to support a network service over a communication network, each of the servers having a primary address, the method comprising the steps of:
assigning a common address as a secondary address for each of the plurality of servers such that each of the servers individually has the secondary address; and
processing client requests directed to the common address such that each of the requests is processed by a particular one of the plurality of servers without modification of the common address in the request, wherein each of the servers provides access to substantially the same set of contents associated with the network service.

35. An apparatus for routing client requests to a plurality of servers configured to support a network service over a communication network, each of the servers having a primary address, the apparatus comprising:
means for assigning a common address as a secondary address for each of the plurality of servers such that each of the servers individually has the secondary address; and
means for processing client requests directed to the common address such that each of the requests is processed by a particular one of the plurality of servers without modification of the common address in the request, wherein each of the servers provides access to substantially the same set of contents associated with the network service.

36. An apparatus for routing client requests for a network service over a communication network, the apparatus comprising:
a plurality of servers configured to support the network service, each of the servers having a primary address and a secondary address, wherein a common address is assigned as the secondary address for each of the plurality of servers such that each of the servers individually has the secondary address, and wherein each of the servers provides access to substantially the same set of contents associated with the network service; and a router coupled to the servers and operative to route client requests directed to the common address such that each of the requests is processed by a particular one of the plurality of servers without modification of the common address in the request.

37. A method of routing client requests to a plurality of servers configured to support a network service over a communication network, each of the servers having a primary address, the method comprising the steps of:

assigning a common address as a secondary address for each of the plurality of servers such that each of the servers individually has the secondary address;

broadcasting a given client request directed to the common address to each of the plurality of servers; and implementing a filtering routine in each of the plurality of servers so that the given client request is processed by only one of the servers without modification of the common address in the request.

38. An apparatus for routing client requests to a plurality of servers configured to support a network service over a communication network, each of the servers having a primary address, the apparatus comprising:

means for assigning a common address as a secondary address for each of the plurality of servers such that each of the servers individually has the secondary address;

means for broadcasting a given client request directed to the common address to each of the plurality of servers; and means for filtering the given client request in each of the plurality of servers so that the given client request is processed by only one of the servers without modification of the common address in the request.

39. An apparatus for routing client requests for a network service over a communication network, the apparatus comprising:

a plurality of servers configured to support the network service, each of the servers having a primary address and a secondary address, wherein a common address is assigned as the secondary address for each of the plurality of servers such that each of the servers individually has the secondary address; and a router coupled to the servers and operative to route client requests directed to the common address such that each of the requests is processed by a particular one of the plurality of servers, wherein the router is further operative to broadcast a given client request directed to the common address to each of the plurality of servers, and further wherein each of the servers implements a filtering routine so that the given client request is processed by only one of the servers without modification of the common address in the request.

\* \* \* \* \*